(12) United States Patent
Gasmi

(10) Patent No.: US 11,435,232 B1
(45) Date of Patent: Sep. 6, 2022

(54) ENERGY METER CIRCUIT FOR SHORT AND LOW-INTENSITY LASER PULSES

(71) Applicant: KING FAHD UNIVERSITY OF PETROLEUM AND MINERALS, Dhahran (SA)

(72) Inventor: Khaled Gasmi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/744,042

(22) Filed: May 13, 2022

(51) Int. Cl.
| | |
|---|---|
| H01S 3/00 | (2006.01) |
| G01J 5/10 | (2006.01) |
| H01S 3/11 | (2006.01) |
| H01S 3/20 | (2006.01) |
| H01S 3/16 | (2006.01) |
| H01S 3/091 | (2006.01) |
| H01S 3/092 | (2006.01) |

(52) U.S. Cl.
CPC .............. *G01J 5/10* (2013.01); *H01S 3/0014* (2013.01); *H01S 3/092* (2013.01); *H01S 3/0912* (2013.01); *H01S 3/11* (2013.01); *H01S 3/1611* (2013.01); *H01S 3/1643* (2013.01); *H01S 3/20* (2013.01)

(58) Field of Classification Search
None
See application file for complete search history.

(56) References Cited

U.S. PATENT DOCUMENTS

| | | | |
|---|---|---|---|
| 4,658,218 A | * | 4/1987 | Kenney-Wallace ........................ H01S 3/094026 372/18 |
| 4,868,390 A | * | 9/1989 | Keller ....................... G01J 5/34 250/338.3 |

(Continued)

FOREIGN PATENT DOCUMENTS

DE 4420572 A1 * 12/1995 ......... G01N 21/6408

OTHER PUBLICATIONS

Barna, et al. ; Compact Energy Measuring System for Short Pulse Lasers ; Metrology and Measurements Systems, No. 2 ; pp. 183-190; Jun. 3, 2013; 9 Pages.

(Continued)

*Primary Examiner* — Mark Hellner
(74) *Attorney, Agent, or Firm* — Oblon, McClelland, Maier & Neustadt, L.L.P.

(57) ABSTRACT

A laser energy meter circuit, method, and system for measuring excitation and ionization of a reactant. The laser energy meter circuit includes a pyroelectric detector head configured to receive laser pulses and output current signals; an amplifier having a first amplifier input and an amplifier output configured to generate amplified voltage signals; a sample-and-hold circuit; a trigger circuit connected to a second sample-and-hold input, wherein the trigger circuit is configured to receive a TTL signal and generate a delayed output pulse, $Q_1$ and a trigger signal, $Q_2$; a sample-and-hold circuit output configured to output the maximum pulse voltage when the trigger signal is received at the second sample-and-hold input; a switched capacitor bank connected to the sample-and-hold circuit output; and a peak detector circuit configured to measure a magnitude of the maximum pulse voltage and generate an averaged DC maximum pulse voltage signal.

20 Claims, 9 Drawing Sheets

(56) References Cited

U.S. PATENT DOCUMENTS

| | | | | |
|---|---|---|---|---|
| 5,114,228 A | * | 5/1992 | Greenfield | G01J 1/4257 356/222 |
| 5,357,111 A | * | 10/1994 | Vecht | G01J 5/34 250/338.3 |
| 2008/0170596 A1 | | 7/2008 | Veer | |
| 2009/0296079 A1 | * | 12/2009 | Cooley | G01J 1/4257 356/221 |

OTHER PUBLICATIONS

Samoylov, et al. ; Pyroelectric USB-joulemeters of pulsed laser radiation ; SPQEO, vol. 23, No. 1 ; pp. 71-74 ; Mar. 23, 2019 ; 4 Pages.

Lu, et al. ; Laser double optical resonance excitation-ionization of Mo with optogalvanic detection ; Physica Scripta, 97 ; Jan. 17, 2022; 7 pages.

* cited by examiner

ENERGY METER CIRCUIT FOR SHORT AND LOW-INTENSITY LASER PULSES

BACKGROUND

Technical Field

The present disclosure is directed to an energy meter circuit for short and low-intensity laser pulses.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Laser spectroscopy is used for determining the elemental composition of materials. Laser spectroscopy requires an accurate measurement of laser energy for excitation and ionization of molecules of a sample under study. Based on the measurements, various properties of the sample can be determined. Laser spectroscopy employs a synchronized use of pump (excitation) laser pulses, and probe (ionization) laser pulses. The pump laser pulse/s excite the molecules of the sample from an initial ground state to a defined excited state where the molecules evolve along the reaction pathway. This evolution is followed by the probe laser pulse/s that ionizes the molecules to another state to be detected. For the excitation process, the pump laser energy is kept within a defined range. The excitation laser energy is maintained much below a certain threshold level in order to ensure a linear photodecomposition process (unsaturated process) of the sample. For the ionization process, the determination of the potential of ionization of the molecules, as well as the selection of the ionization process type (single photon or multiphoton), depends strongly on the ionization laser energy. In high-resolution spectroscopy using a resonance-enhanced multiphoton ionization (REMPI) technique, the excitation laser energy plays an important role in the resolution of measurements because the increase in the laser excitation energy leads to the broadening in the rotational-vibrational absorption lines.

A laser energy meter is used in high-resolution spectroscopy to measure the excitation and ionization laser energy. The laser energy meter is connected to a commercial sensor to determine the intensity of a laser beam's energy output. Further, a specific laser energy meter is required to analyze lasers within a particular range of wavelengths or intensities. Aforementioned laser energy meters for a wide range of wavelengths are expensive. Also, the existing laser energy meter only measures the laser energy below one hundred joules, and when the laser energy exceeds a threshold value, either the laser energy meter is damaged or/and provides false readings.

Hence, there is a need for a versatile energy meter that can measure the excitation and ionization laser energy above one hundred joules.

SUMMARY

In an exemplary embodiment, a laser energy meter circuit is disclosed. The laser energy meter circuit includes a pyroelectric detector head configured to receive laser pulses and output current signals proportional to the laser pulses; an amplifier having a first amplifier input and an amplifier output, wherein the first amplifier input is connected to the pyroelectric detector head and configured to receive the current signals and the amplifier output is configured to generate amplified voltage signals; a sample-and-hold circuit having a first sample-and-hold input connected to the amplifier output to receive the amplified voltage pulses, wherein the sample-and-hold circuit is configured to charge a hold capacitor to a maximum pulse voltage with the amplified voltage pulses; a trigger circuit connected to a second sample-and-hold input, wherein the trigger circuit is configured to receive a transistor-to-transistor logic (TTL) signal and generate a delayed output pulse, $Q_1$ and a trigger signal, $Q_2$; a sample-and-hold circuit output configured to output the maximum pulse voltage when the trigger signal is received at the second sample-and-hold input; a switched capacitor bank connected to the sample-and-hold circuit output; and a peak detector circuit connected to the switched capacitor bank, wherein the peak detector circuit is configured to measure a magnitude of the maximum pulse voltage and generate an averaged DC maximum pulse voltage signal.

In another exemplary embodiment, a system for measuring excitation and ionization of a reactant is disclosed. The system includes a supersonic molecular beam source configured to cool molecules of the reactant to a low vibration state; a dye laser configured to transmit pulses of excitation energy into the reactant; a neodymium-doped yttrium aluminum garnet (ND:YAG) laser configured to transmit pulses of ionization energy into the reactant, wherein the pulses of ionization energy are delayed with respect to the pulses of excitation energy, and the pulses of ionization energy are collinear with the pulses of excitation energy; a pyroelectric detector head configured to receive the pulses of excitation energy and the pulses of ionization energy and generate current pulses proportional to the pulses of excitation energy and the pulses of ionization energy; a laser energy meter circuit including: an amplifier having a first amplifier input and an amplifier output, wherein the first amplifier input is connected to the pyroelectric detector head and is configured to receive the current pulses, and wherein the amplifier output is configured to generate amplified voltage pulses; a sample-and-hold circuit having a first sample-and-hold input connected to the amplifier output to receive the amplified voltage pulses, wherein the sample-and-hold circuit is configured to charge a hold capacitor to a maximum pulse voltage with the amplified voltage pulses; a trigger circuit connected to a second sample-and-hold input, wherein the trigger circuit is configured to receive a transistor-to-transistor logic (TTL) signal and generate a delayed output pulse, $Q_1$ and a trigger signal, $Q_2$; a sample-and-hold circuit output configured to output the maximum pulse voltage when the trigger signal is received at the second sample-and-hold input; a switched capacitor bank connected to the sample-and-hold circuit output; and a peak detector circuit connected to the switched capacitor bank, wherein the peak detector circuit is configured to measure a magnitude of the maximum pulse voltage and generate an averaged DC maximum pulse voltage signal.

In another exemplary embodiment, a method for measuring excitation and ionization of a reactant is disclosed. The method includes cooling, with a supersonic molecular beam, molecules of the reactant to a low vibration state. The method further includes transmitting, with a dye laser, pulses of excitation energy into the reactant. The method further includes transmitting, with a neodymium-doped yttrium aluminum garnet (ND:YAG) laser, pulses of ionization energy into the reactant, wherein the pulses of ionization energy are delayed with respect to the pulses of excitation energy, and the pulses of ionization energy are collinear with the pulses of excitation energy. The method further includes receiving, with a pyroelectric detector head, the pulses of excitation energy and the pulses of ionization energy and generating current pulses proportional to the pulses of excitation energy and the pulses of ionization energy. The method further includes receiving, with an amplifier, the current pulses and generating amplified voltage pulses; receiving, by a sample-and-hold circuit having a first sample-and-hold input connected to the amplifier output, the amplified voltage pulses. The method further includes charging, with the sample-and-hold circuit, a hold capacitor to a maximum pulse voltage with the amplified voltage pulses; receiving, by a trigger circuit, a transistor-to-transistor logic (TTL) signal. The method further includes generating, by the trigger circuit, a delayed output pulse, $Q_1$ and a trigger signal, $Q_2$. The method further includes receiving, at a second sample-and-hold input, the trigger signal, $Q_2$. The method further includes outputting, by a sample-and-hold circuit, the maximum pulse voltage. The method further includes charging a switched capacitor bank with the maximum pulse voltage. The method further includes measuring, with a peak detector circuit connected to the switched capacitor bank, a magnitude of the maximum pulse voltage. The method further includes generating, with a digital oscilloscope, an averaged DC maximum pulse voltage signal.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
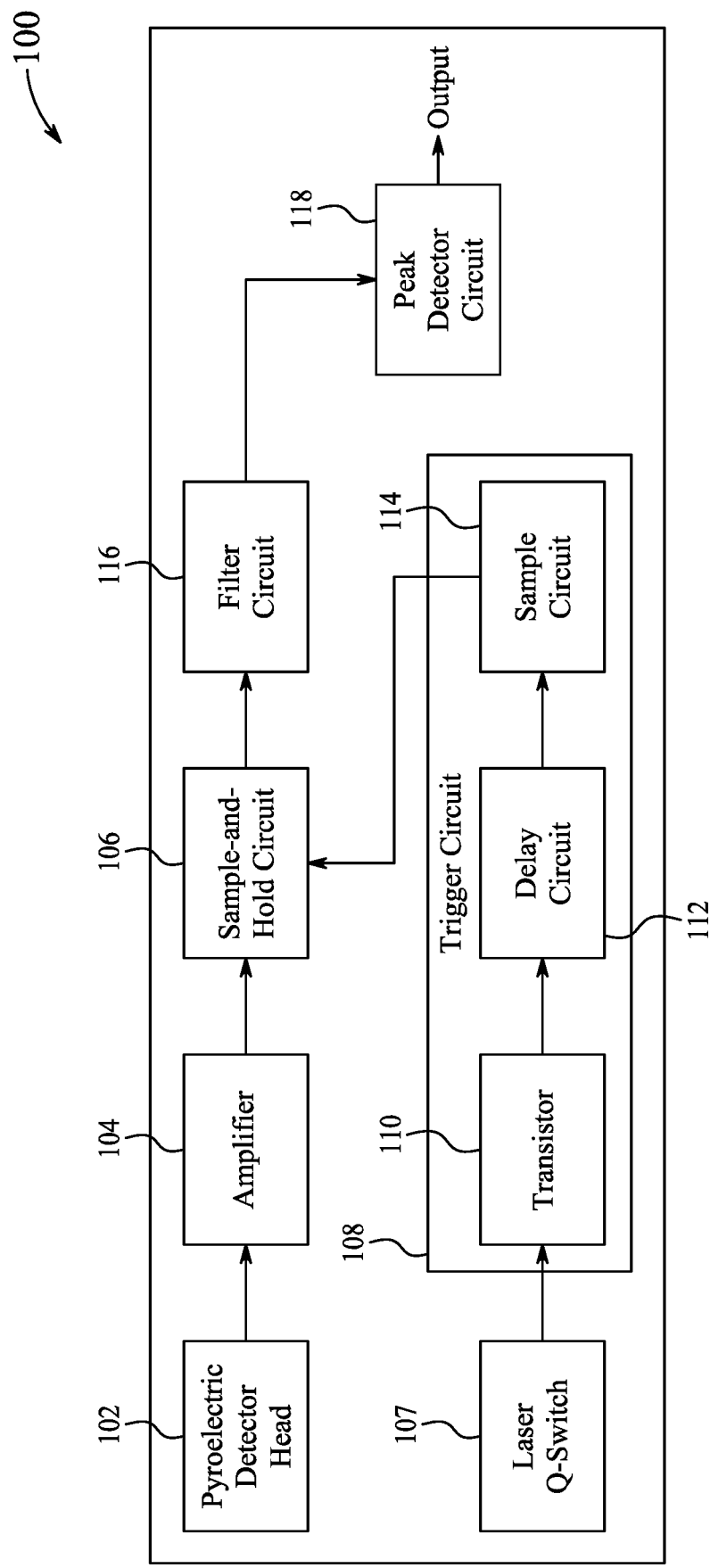
FIG. 1 illustrates a block diagram of a laser energy meter circuit, according to aspects of the present disclosure.

In the drawings, like reference numerals designate identical or corresponding parts throughout the several views.

Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to an energy meter circuit and a system for measuring excitation and ionization of a reactant.

In the present disclosure, the term "connected", "connected to" and "electrically connected" refer to physical connection between components by any one of wires, buses, contact pads, solder, and pins.

The energy meter circuit of the present disclosure is configured to measure short and low-intensity laser pulses. The energy meter circuit is configured to be used with a pyroelectric detector head. The energy meter circuit converts a pulsed output voltage signal of the pyroelectric detector head into a continuous voltage signal proportional to a maximum voltage of the output pulse for easy data acquisition. The energy meter circuit is configured to be triggered by a laser Q-switch pulse and read the maximum voltage of the output pulse. Further, the energy meter circuit is configured to maintain the voltage constant until the next trigger pulse (trigger signal). The energy meter circuit is configured to interface with an electronic device through a digital oscilloscope and to measure the excitation and ionization laser energy in high-resolution spectroscopy of molecules.

FIG. 1 illustrates a block diagram of a laser energy meter circuit 100 for measuring energy output of laser beams, according to one or more aspects of the present disclosure. Referring to FIG. 1, the laser energy meter circuit 100 includes a pyroelectric detector head 102, an amplifier 104, a sample-and-hold circuit 106, a trigger circuit 108, a filter circuit 116, and a peak detector circuit 118.

The pyroelectric detector head 102 is configured to receive laser pulses and output current signals proportional to the received laser pulses. Specifically, the pyroelectric detector head 102 receives the pulses of excitation energy and the pulses of ionization energy (laser pulses) from a laser source. The pyroelectric detector head 102 generates current pulses (current signals) proportional to the received pulses of excitation energy and the pulses of ionization energy. In an example, the laser pulses may be provided from a rapidly pulsing laser source such as a pulsed laser, an excimer laser, or a diode laser. The pyroelectric detector head 102 includes a heat sensor (thermal detector) mounted in a heat dissipating head. The pyroelectric detector head 102 is configured to measure the energy of the received pulses.

In operation, the laser pulses are directed towards the pyroelectric detector head 102, such that the directed laser pulses impinge on the heat sensor, located within the pyroelectric detector head 102. The heat sensor is configured to absorb a part of the incident laser power, and provide a voltage output (current signal) that corresponds to the heating effect thereof. The heat sensor is selected from a group including a thermopile detector and a pyroelectric detector. The pyroelectric detector head 102 may also have a plurality of cooling fins and a volume absorber, such as is known in the art.

The amplifier 104 has a first amplifier input, a second amplifier input, and an amplifier output. The amplifier 104 is electrically connected to the pyroelectric detector head 102 and receives the current signals at the first amplifier input. The amplifier 104 is configured to generate amplified voltage signals as the amplifier output. In an example, the amplifier 104 includes a low noise preamplifier (LNP) and a variable gain amplifier (VGA). In an example, the LNP is configured to have a fixed gain. The VGA is configured to provide a variable gain based on the applied control voltage (CV). An amplifier feedback path is located between the second amplifier input and the amplifier output.

The sample-and-hold circuit 106 includes a first sample-and-hold input, a second sample-and-hold input, and a sample-and-hold circuit output. In an operative embodiment, the sample-and-hold circuit 106 is commutatively coupled to the amplifier 104 to receive the amplified voltage signals. The first sample-and-hold input is connected to the amplifier output and receives the amplified voltage pulses from the amplifier output. A hold capacitor, $C_H$, is connected to the sample-and-hold circuit 106. The sample-and-hold circuit 106 is configured to charge the hold capacitor $C_H$ to a maximum pulse voltage with the amplified voltage pulses. The hold capacitor, $C_H$, and a variable resistor circuit are configured to provide an adjustable sampling window to the sample-and-hold circuit 106.

The trigger circuit 108 is connected to the sample-and-hold circuit 106 through the second sample-and-hold input. The trigger circuit 108 is configured to receive a transistor-to-transistor logic (TTL) signal from a laser Q-switch 107 and generate a delayed output pulse, $Q_1$ and a trigger signal, $Q_2$. The trigger circuit 108 includes a transistor 110, a diode (not shown), a collector resistor (not shown), a first monostable vibrator (delay circuit) 112, and a second monostable vibrator (sample circuit) 114.

The first monostable vibrator 112 is configured to receive the TTL signal from the laser Q-switch 107, and generate the delayed output pulse, $Q_1$. The second monostable vibrator 114 is connected in series with the first monostable vibrator 112, and receives the delayed output pulse, $Q_1$ from the first monostable vibrator 112. The second monostable vibrator 114 is configured to sample the delayed output pulse and generate the trigger signal, $Q_2$.

In operation, the second sample-and-hold input of the sample-and-hold circuit 106 is configured to receive the trigger signal, $Q_2$ from the trigger circuit 108 and the sample-and-hold circuit output is configured to output the maximum pulse voltage when the trigger signal, $Q_2$ is received at the second sample-and-hold input.

The filter circuit (second filter circuit) 116 includes a resistor and a switched capacitor bank. The resistor is connected to the sample-and-hold circuit output. In some examples, the resistor represents a load. However, when the load is disconnected, the resistor may be used to provide a path to GND. The resistor prevents the input from floating and enhances a stability of the circuit.

The switched capacitor bank is connected to the sample-and-hold circuit output and receives the maximum pulse voltage from the sample-and-hold circuit 106. The switched capacitor bank includes a plurality of bank capacitors and a plurality of switches.

The peak detector circuit 118 is connected to the filter circuit 116. The peak detector circuit 118 is configured to measure a magnitude of the maximum pulse voltage and generate an averaged DC maximum pulse voltage signal. The peak detector circuit 118 includes a unity gain buffer. The unity gain buffer includes a first unity gain buffer input, a second unity gain buffer input, and a unity gain buffer output. The first unity gain buffer input is connected to the second filter circuit. The first unity gain buffer input is configured to receive the maximum pulse voltage from sample-and-hold circuit 106. The second unity gain buffer input is connected to the unity gain buffer output. The unity gain buffer output is configured to receive the maximum pulse voltage and generate a maximum voltage signal every second.

The peak detector circuit 118 includes a digital oscilloscope (not shown in FIG. 1) having a plurality of input channels. One of the input channels is connected to the unity gain buffer output. The digital oscilloscope receives the DC maximum voltage signal from the unity gain buffer output. The digital oscilloscope is configured to average the DC maximum voltage signals and generate averaged DC maximum voltage signal at an output channel. An example implementation of FIG. 1 is explained in detail in FIG. 3.

Figure 2:
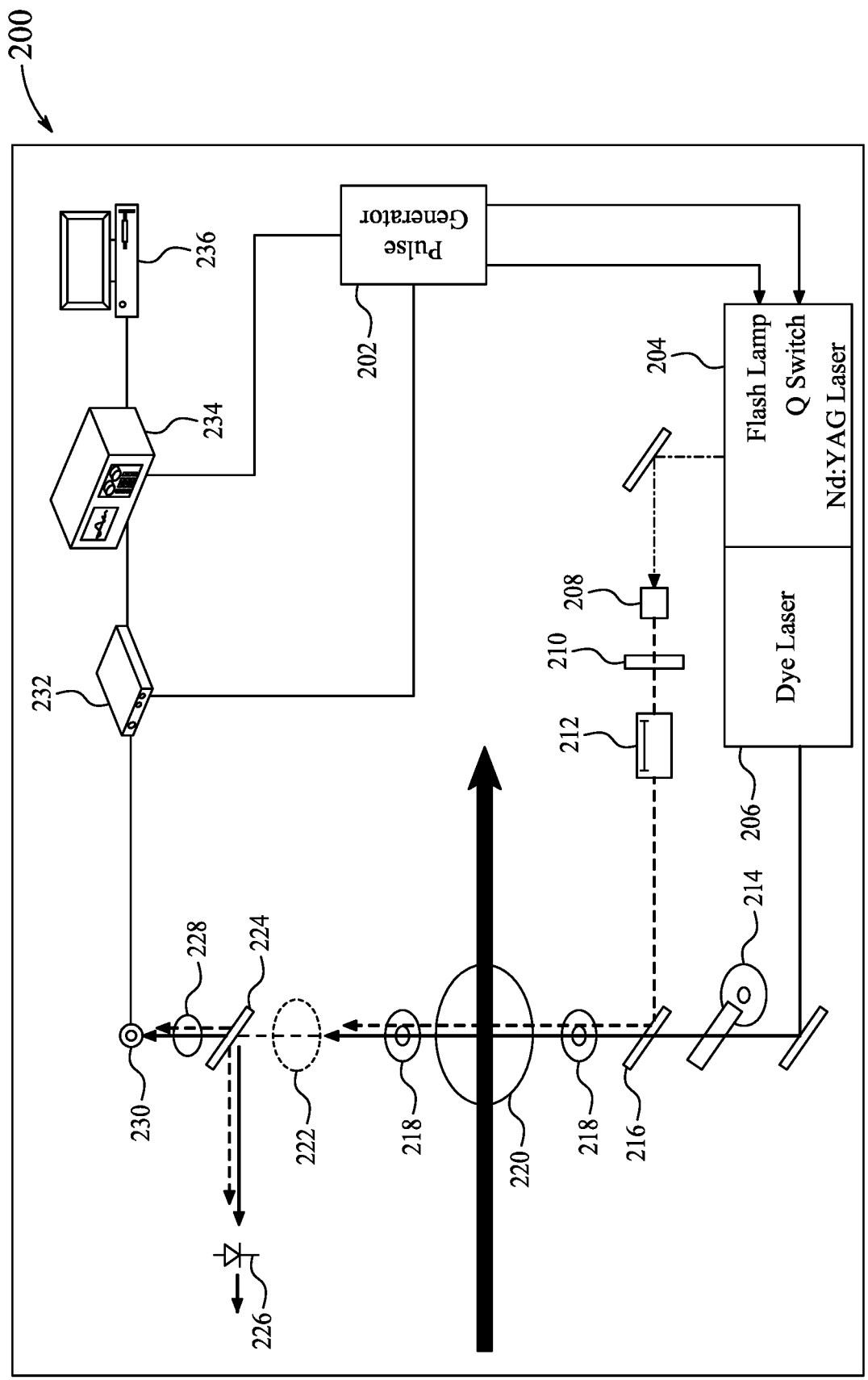
FIG. 2 illustrates a schematic diagram of a system for measuring excitation and ionization of a reactant, according to aspects of the present disclosure.

FIG. 2 illustrates a schematic diagram of a system 200 for measuring excitation and ionization of a reactant, according to aspects of the present disclosure.

As shown in FIG. 2, the system 200 includes a pulse generator 202, a neodymium-doped yttrium aluminum garnet (ND:YAG) laser 204, a dye laser 206, a Potassium Dihydrogen Phosphate (KDP) crystal 208, a Band-Stop Filter (BSF) 210, an optical delay 212, a shutter 214, a dichroic mirror 216, at least two irises 218, a vacuum detection chamber 220, a glass window 222, a beam splitter 224, a photodiode 226, a quartz lens 228, a pyroelectric detector head 230, an energy meter circuit 232, a digital oscilloscope 234, and an electronic device 236.

The vacuum detection chamber (supersonic molecular beam source) 220 is configured to cool molecules of the reactant to a low vibration state. The vacuum detection chamber 220 is configured to generate a supersonic molecular beam. The supersonic molecular beam is formed when a gas is expanded from a higher pressure region into a lower pressure region, through a small orifice. Time of Flight mass spectrometry (TOFMS) is based on ions with the same energy, but different masses travel with different velocities. Ions (molecular beam), formed by a short ionization event, are accelerated by an electrostatic field obtaining the same kinetic energy, which travels over a drift path to the pyroelectric detector head 230. Lighter ions arrive at the pyroelectric detector head 230 before the heavier ions, and a mass spectrum is recorded. Measuring the flight time for each ion allows for the determination of various properties such as their mass to charge ratios, their speed, and such properties.

The dye laser 206 is configured to transmit pulses of excitation energy into the reactant. The dye laser 206 is a laser configured to use a dye (typically in a liquid solution) as a laser gain medium. In some examples, the dye laser 206 may be a ring laser or a solid dye laser. In an example, the dye laser 206 is a PrecisionScan-G laser, manufactured by MKS Instruments Light & Motion division (located at 2 Tech Drive, Suite 201, Andover, Mass., United States of America) under a brand Spectra-Physics, having wavelength 370 to 920 nm, and pulse energy 1000 to 1400 mj.

The neodymium-doped yttrium aluminum garnet (ND:YAG) laser 204 is configured to transmit pulses of ionization energy into the reactant. In one examples, the pulses of ionization energy are delayed with respect to the pulses of excitation energy. In some examples, the pulses of ionization energy are collinear with the pulses of excitation energy. The Nd:YAG laser 204 is a quanta-ray pro-230 laser, manufactured by MKS Instruments Light & Motion division (located at 2 Tech Drive, Suite 201, Andover, Mass., United States of America) under a brand Spectra-Physics.

The pyroelectric detector head 230 is configured to receive the pulses of excitation energy and the pulses of ionization energy from the dye laser 206 and the ND:YAG laser 204, respectively. The pyroelectric detector head 230 is configured to generate current pulses proportional to the received pulses of excitation energy and pulses of ionization energy.

The pulses of ionization energy is configured to pass through a number of components such that directed and high frequency pulses of ionization energy may be fed to the pyroelectric detector head 230. Due to nonlinear atomic polarization properties, the KDP crystal 208 is configured to emit a different frequency of light than absorbed. The KDP crystal 208 is configured to receive pulses of ionization energy from the ND:YAG laser 204. To provide second order effects of atomic polarization, the KDP crystal 208 causes a doubling in the frequency of the received pulses of ionization energy.

The BSF 210 is configured to stop a specific range of frequencies from passing to the output and generate a filtered laser beam (pulses of ionization energy having specific frequency as per requirements). The BSF 210 is configured to receive the pulses of ionization energy from the KDP crystal 208 and allow lower and higher frequencies to pass with little attenuation. In some examples, the BSF 210 is a wide BSF, or a narrow BSF.

The optical delay 212 is configured to provide an adjustable delay to the filtered laser beam and generate delayed pulses of ionization energy.

The dichroic mirror 216 is a mirror with significantly different reflection or transmission properties at two different wavelengths. The dichroic mirror 216 is configured to guide the laser beam.

The irises 218 are placed before and after the vacuum detection chamber 220 for collimation. The iris 218, placed before the detection chamber, is also used to control the two laser beams spots.

The laser energy meter circuit 232 is substantially similar to that of the laser energy meter circuit 100, and thus is not repeated here in detail for the sake of brevity. The laser energy meter circuit 232 includes an amplifier, a sample-and-hold circuit, a trigger circuit, a switched capacitor bank, and a peak detector circuit. The amplifier includes a first amplifier input, a second amplifier input, and an amplifier output. The first amplifier input is connected to the pyroelectric detector head 230 and is configured to receive the current pulses. The amplifier output is configured to generate amplified voltage pulses. Further, the sample-and-hold circuit is configured to generate maximum pulse voltage with the amplified voltage pulses. The peak detector circuit 118 is configured to measure a magnitude of the maximum pulse voltage and generate an averaged DC maximum pulse voltage signal. The energy meter circuit 232 is configured to receive the current signal and generate a delayed output pulse, $Q_1$, and the trigger signal, $Q_2$.

The pulse generator 202 is configured to receive the delayed output pulse, $Q_1$ and the trigger signal, $Q_2$ from the laser energy meter circuit 232. The pulse generator 202 generates a first time delayed electrical pulse on receiving the delayed output pulse, $Q_1$ and a second time delayed electrical pulse on receiving the trigger signal, $Q_2$. The first time delayed electrical pulse is connected to a flash lamp of the ND:YAG laser 204. The second time delayed electrical pulse is connected to a Q switch of the ND:YAG laser 204.

In the working embodiment, the system 200 may be configured to measure the excitation and ionization laser energy in, for example, REMPI (Resonant Enhanced MultiPhoton Ionization) and photodecomposition experiments. In REMPI experiments, the two laser beams (an ionization laser, and an excitation laser) enter collinearly and simultaneously into the vacuum detection chamber 220 through an iris 218. In photodecomposition experiments, the ionization laser (beam) arrives later, a few nanoseconds after the excitation laser (beam), using the optical delay 212. For the excitation laser, a pulsed and tunable dye laser 206 is used, while for the ionization laser a fourth harmonic of the pulsed Nd:YAG laser 204 is used. In a typical high-resolution spectroscopy experiment, energy of the excitation and ionization laser is a few microjoules and tens of microjoules, respectively. The at least two irises 218 are placed before and after the vacuum detection chamber 220 for collimation purposes. The iris 218 is placed before the vacuum detection chamber 220 and is used to control the two laser beams spots. For separate laser energy measurements of the laser beam, the shutter 214 is used to block the excitation laser beam, while the glass window 222 is used to block the ionization laser beam. The shutter 214 is opened and closed using an electronic circuit via the electronic device 236. The quartz lens 228 is used to focus the laser beams on the active region of the pyroelectric detector head 230. In an example, the pyroelectric detector head 230 is an ED-100A detector head, manufactured by Gentec Electro-Optics (located at 445 Avenue St Jean Baptiste #160, Québec, QC G2E 5N7, Canada).

For example, and without limitation, the electronic device 236 may refer to a mobile device, Personal Digital Assistant (PDA), desktop computer, a tablet, a netbook, a wireless terminal, a laptop computer, a wearable computer device, or any other computing device.

The pyroelectric detector head 230 is calibrated and provided with a conversion factor of 125 V/J to calculate the laser energy from the pulse voltage for the specific load of 1 M. To visualize the nanoseconds laser pulses, a fast silicon photodiode 226 and the digital oscilloscope 234 are used. In an example, the digital oscilloscope 234 is a HDO4104-MS oscilloscope, manufactured by Teledyne LeCroy (located at 700 CHESTNUT RIDGE RD, Chestnut Ridge, N.Y. 10977). The beam splitter 224 is configured to receive the pulsed laser beam, allow (pass) a first portion of the received laser beam through the beam splitter 224 towards the pyroelectric detector head 230, and divert a second portion of the pulsed laser beam towards the fast silicon photodiode 226. The pulse generator 202 is used to control the synchronization between the different parts of the system 200 using trigger electrical pulses with variable delays with respect to each other. A clock running at a frequency of 10 Hz, which is the repetition rate of the lasers, generates the master pulse. With regard to the excitation and ionization lasers, two time-delayed electrical pulses are used to externally trigger the flash lamp and the Q-switch of the Nd:YAG laser 204. Laser output energy may be changed by varying the delay time between the two time-delayed electrical pulses. The time-delayed electrical pulse is used to trigger the laser Q-switch and the energy meter circuit 232.

Figure 3:
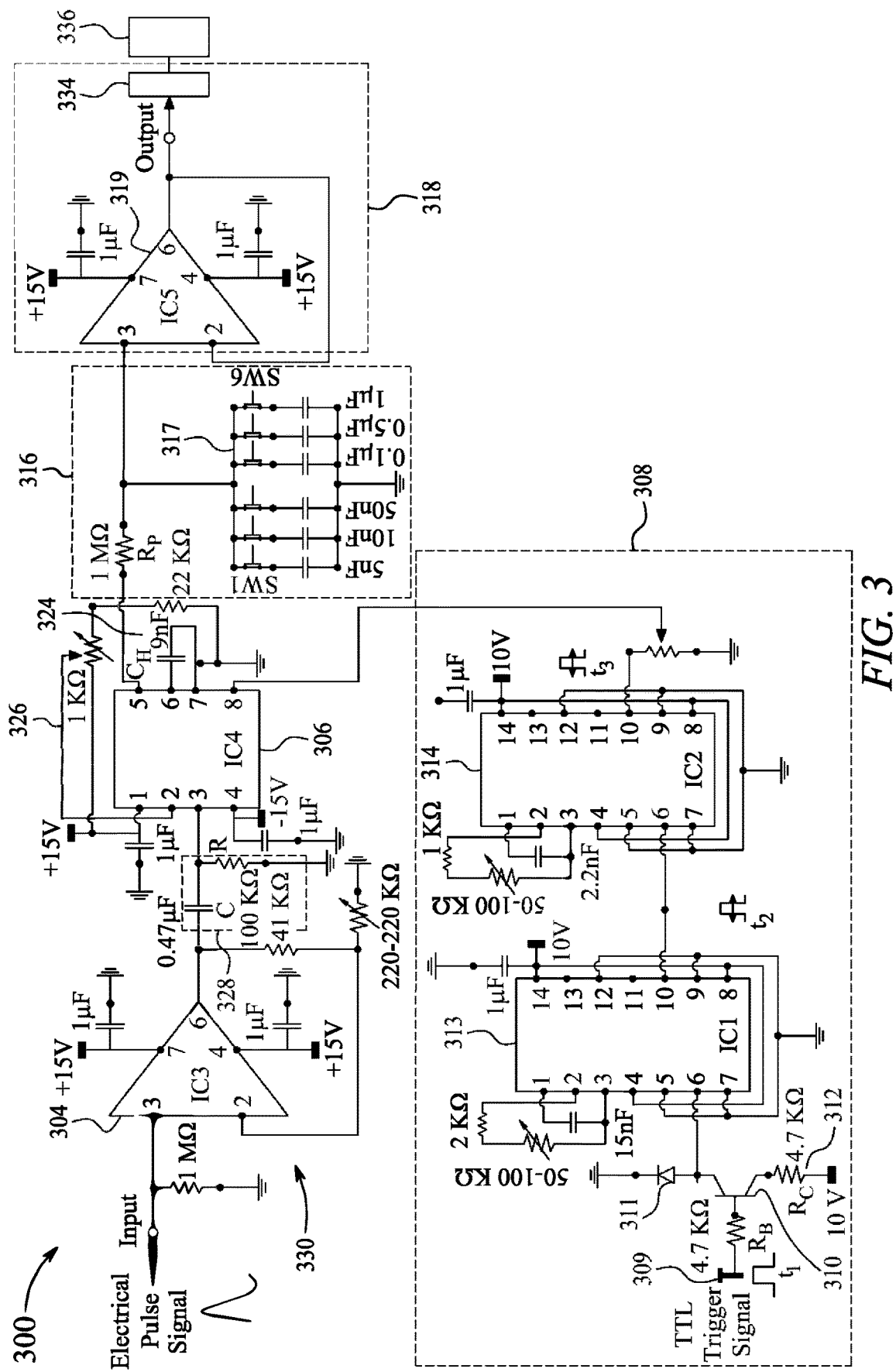
FIG. 3 represents a circuit diagram of an energy meter circuit, according to aspects of the present disclosure.

FIG. 3 represents a circuit diagram of an energy meter circuit 300, according to aspects of the present disclosure.

The energy meter circuit 300 includes an amplifier 304, a sample-and-hold circuit 306, a trigger circuit 308, a filter circuit 316, a peak detector circuit 318, a digital oscilloscope 334, and an electronic device 336. The energy meter circuit 300 is configured to receive current signals from the pyroelectric detector.

As shown in FIG. 3, the amplifier 304 includes a first amplifier input at pin 3 of the amplifier 304, a second amplifier input at pin 2 of the amplifier 304, and an amplifier output at pin 6 of the amplifier 304. The first amplifier input at pin 3 of the amplifier 304 is connected to the pyroelectric detector head (not shown) and receives the current signals from the pyroelectric detector head. The amplifier 304 generates amplified voltage signals and outputs the amplified voltage signals through the amplifier output at pin 6 of the amplifier 304. An amplifier feedback path 330 is provided between the second amplifier input at pin 2 of the amplifier 304 and the amplifier output at pin 6 of the amplifier 304. The amplifier feedback path 330 includes a voltage divider formed by a first resistor in series with the feedback path and a first variable resistor (feedback resistor) connected to the ground. In an example, the first variable resistor may be 220Ω, to 22 kΩ. In an example, the amplifier 304 is a voltage gain amplifier. The amplifier 304 is configured to amplify the voltage signal across the pyroelectric detector load (not shown) to generate a usable voltage signal. In an example, the amplifier 304 is an ultra-low offset operational amplifier. For example, the amplifier 304 is an integrated circuit (for example, OPO7, manufactured by Analog Devices located at Norwood, Mass., United States). By varying the feedback resistor $R_f$ (variable second resistor) the gain of the amplifier 304 is changed leading to a wide dynamic range measurement. In some examples, a pair of PIN diodes (not shown) may be placed at the input of the circuit 300 to protect it against high electrical pulses when high-intensity laser pulses are used.

The sample-and-hold circuit 306 includes a first sample-and-hold input at pin 3 of the sample-and-hold circuit 306, a second sample-and-hold input at pin 8 of the sample-and-hold circuit 306, and a sample-and-hold circuit output at pin 5 of the sample-and-hold circuit 306. The first sample-and-hold input at pin 3 of the sample-and-hold circuit 306 is connected to the amplifier output at pin 6 of the amplifier 304 and receives the amplified voltage pulses from the amplifier 304. In an example, the sample-and-hold circuit 306 an integrated circuit (for example, OPO7, manufactured by Analog Devices located at Norwood, Mass., United States).

A first filter circuit 328 is connected between the amplifier output at pin 6 of the amplifier 304 and the first sample-and-hold input at pin 3 of the sample-and-hold circuit 306. The first sample-and-hold input at pin 3 of the sample-and-hold circuit 306 is AC coupled (via first filter circuit 328) to the output of the amplifier 304. The AC coupling is used to eliminate the possible drift of the output voltage (DC offset) of the amplifier. The first filter circuit 328 includes a first capacitor and a second resistor. The first capacitor is connected in series with the amplifier output at pin 6 of the amplifier 304. The second resistor is connected between the first capacitor and the ground. The sample-and-hold circuit 306 is an integrated circuit (for example, LF398, manufactured by National semiconductor (currently owned by Texas Instruments located at 500, TI Blvd Dallas, Tex. 75243, United States of America)).

The sample-and-hold circuit 306 is used as a unity gain follower, thereby providing an ultra-high DC accuracy with a fast signal acquisition, low droop rate, high supply rejection ratio, low offset voltage, and low output noise.

In an operation, a hold capacitor, $C_H$, 324 is connected to the sample-and-hold circuit 306. The sample-and-hold circuit 306 is configured to charge the $C_H$ 324 to a maximum pulse voltage. The $C_H$ 324 is connected between a logic reference pin at pin 7 of the sample-and-hold circuit 306 and a capacitor input pin at pin 6 of the sample-and-hold circuit 306. Also, a second variable resistor 326 is connected between the logic reference pin at pin 7 of the sample-and-hold circuit 306 and an offset pin at pin 1 of the sample-and-hold circuit 306. The $C_H$ 324 and the second variable resistor 326 are configured to provide an adjustable sampling window to the sample-and-hold circuit 306.

The trigger circuit 308 is configured to receive a TTL signal from a laser Q-switch 309 of the ND:YAG laser and generate a delayed output pulse, $Q_1$, and a trigger signal, $Q_2$. The trigger circuit 308 includes a transistor 310, a diode 311, a collector resistor ($R_C$) 312, a first monostable vibrator 313, and a second monostable vibrator 314. In operation, the energy meter circuit 300 is triggered by the transistor 310. For example, the transistor 310 is a 2N3904 IC manufactured by STMicroelectronics (located at Plan-les-Ouates, Geneva, Switzerland). The transistor 310 has a base connected to the laser Q-switch 309. The diode 311 is connected to an emitter of the transistor 310. The diode 311 is configured to increase a switching threshold to 1.4 V to be compatible with the TTL input voltage level of the subsequent electronic stages and the laser Q-switch trigger pulse. For example, the diode 311 is 1N4148 IC, manufactured by Vishay Inter technology (located at Vishay Americas One Greenwich Place Shelton, Conn. 06484 United States). The collector resistor ($R_C$) 312 is connected to a collector of the transistor 310. Further, the first monostable vibrator 313 is connected to the emitter of the transistor 310.

The first monostable vibrator 313 is configured to receive the TTL signal from the laser Q-switch 309, and generate the delayed output pulse, $Q_1$. For example, the first monostable vibrator 313 is CD4047BB, manufactured by Fairchild Semiconductor (located at 333 Western Ave, South Portland, Me. 04106, United States). The second monostable vibrator 314 is connected in series with the first monostable vibrator 313. The second monostable vibrator 314 is configured to sample the delayed output pulse and generate the trigger signal, $Q_2$.

The trigger circuit 308 is connected to the second sample-and-hold input at pin 8 of the sample-and-hold circuit 306. When the second sample-and-hold input at pin 8 of the sample-and-hold circuit 306 receives a trigger signal, the sample-and-hold circuit output at pin 5 of the sample-and-hold circuit 306 is configured to output the maximum pulse voltage.

On triggering with the TTL signal, the trigger circuit 308 generates the output pulse $Q_1$. An output pulse width of the output pulse $Q_1$ is independent of the trigger pulse duration. The output pulse width may be set using an external capacitor and an external resistor. The external capacitor is 15 microFarad, and the external resistor is 50-100k ohm. The second monostable vibrator 314 generates the trigger signal, $Q_2$, with variable width and delayed in time with respect to the laser Q-switch trigger pulse. In some examples, the output pulse width of $Q_1$ lies in a range of 40 μs to 1.5 ms, whereas the output pulse width of $Q_2$ lies in range of 10 μs to 1 ms. Two negative-edge trigger monostable multivibrators (313, 314) are connected in series to generate the delayed output pulse, $Q_1$ and the trigger signal $Q_2$.

In a conventional high-resolution spectroscopy in molecular beams experiment, a delay time between the triggers for the molecular beam pulsed valve and the excitation laser is in the range of 1100-1400 μs. Hence, the delayed output pulse, $Q_1$, and the trigger signal $Q_2$ are supplied to the second sample-and-hold input at pin 8 of the sample-and-hold circuit 306, thereby capturing the maximum pulse voltage received at the second sample-and-hold input.

When the trigger signal $Q_2$ is high (logic level 1), the maximum voltage that coincides with the adjustable sampling window of the sample-and-hold circuit 306 corresponding to $Q_2$ pulse width is captured. On the other hand, when the trigger signal $Q_2$ is low (logic level 0), the sampled value is held by the sample-and-hold circuit 306 until the next pulse $Q_2$ arrives. In hold mode, the output of the sample-and-hold circuit 306 is insensitive to the variation of its input. To optimize the process, the type and magnitude of the hold capacitor $C_H$ type and magnitude are chosen to obtain the required DC accuracy at the output of the sample-and-hold circuit 306. External DC zeroing (nulling) is achieved using an external resistive circuit connected to the offset pin at pin 1 of the sample-and-hold circuit 306.

The filter ($R_M C_{Mn}$ circuit) 316 includes an isolation resistor, $R_M$ and a switched capacitor bank 317. The switched capacitor bank 317 is connected to the sample-and-hold circuit output at pin 5 of the sample-and-hold circuit 306. The switched capacitor bank 317 includes a plurality of bank capacitors and a plurality of switches ($SW_n$). Each bank capacitor is in series with a respective switch and in parallel with each other bank capacitor. Closing a respective switch adds a capacitance of a respective capacitor to a summed capacitance of the capacitor bank. The filter circuit ($R_M C_{Mn}$) 317 is configured to set a hold settling time of the peak detector circuit 318.

The peak detector circuit 318 is connected to the filter circuit 316. The peak detector circuit 318 is configured to measure a magnitude of the maximum pulse voltage and generate an averaged DC maximum pulse voltage signal. The peak detector circuit 318 includes a unity gain buffer 319, and a digital oscilloscope 334. The unity gain buffer 319 includes a first unity gain buffer input at pin 3 of the unity gain buffer 319, a second unity gain buffer input at pin 2 of the unity gain buffer 319, and a unity gain buffer output at pin 6 of the unity gain buffer 319. The first unity gain buffer input at pin 3 of the unity gain buffer 319 is connected to the filter circuit 316. The unity gain buffer 319 is configured to receive the maximum pulse voltage at the first unity gain buffer input at pin 3 of the unity gain buffer 319 from the sample-and-hold circuit output at pin 5 of the sample-and-hold circuit 306. The unity gain buffer 319 is configured to generate a maximum voltage signal every second.

The unity gain buffer output follows the input and tracks the voltage across the capacitor until the maximum voltage is attained and holds that value as the input decreases. The capacitor $C_{Mn}$ is charged to its maximum voltage by the output current of the sample-and-hold circuit 306 through the resistor $R_M$. The resistor $R_M$ also isolates the sample-and-hold circuit 306 from the capacitor $C_{Mn}$ to prevent interference. The value of the capacitor sets the hold settling time of the output of the unity gain buffer. By closing the switches ($SW_n$), different capacitors (of different values) can be selected. In some examples, the capacitors may be switched manually or/and automatically. The unity gain buffer 319 isolates the filter circuit ($R_M C_{Mn}$) 316 from the oscilloscope 334 input due to its high impedance input, and at the same time drive the required current into the oscilloscope 334 due to its low impedance output.

The unity gain buffer 319 is configured to hold the maximum pulse voltage. The digital oscilloscope 334 is configured to receive the maximum pulse voltage each time as it is triggered by the delayed output pulse, $Q_1$. Further, the digital oscilloscope 334 is configured to average the maximum pulse voltages and generate the averaged DC maximum voltage signal at an output channel.

The output of the unity gain buffer is connected to one input channel of the digital oscilloscope 334, which is triggered using the electrical pulse used to trigger the laser Q-switch, by selecting the oscilloscope input impedance of 1 MΩ. The digital oscilloscope 334 is interfaced to the electronic device 336. The electronic device 336 is configured to measure the excitation and ionization energy, i.e., the output voltage of the energy meter circuit. The digital oscilloscope 334 is configured to average the measurement to reduce noise. The digital oscilloscope 334 is configured to save the signals from all the channels and transfer the collected saved signals to the electronic device 336. The electronic device 336 is configured to analyze the received signals. The acquired signals are used in the spectroscopic and dynamics analysis of the molecules under study.

Figure 4:
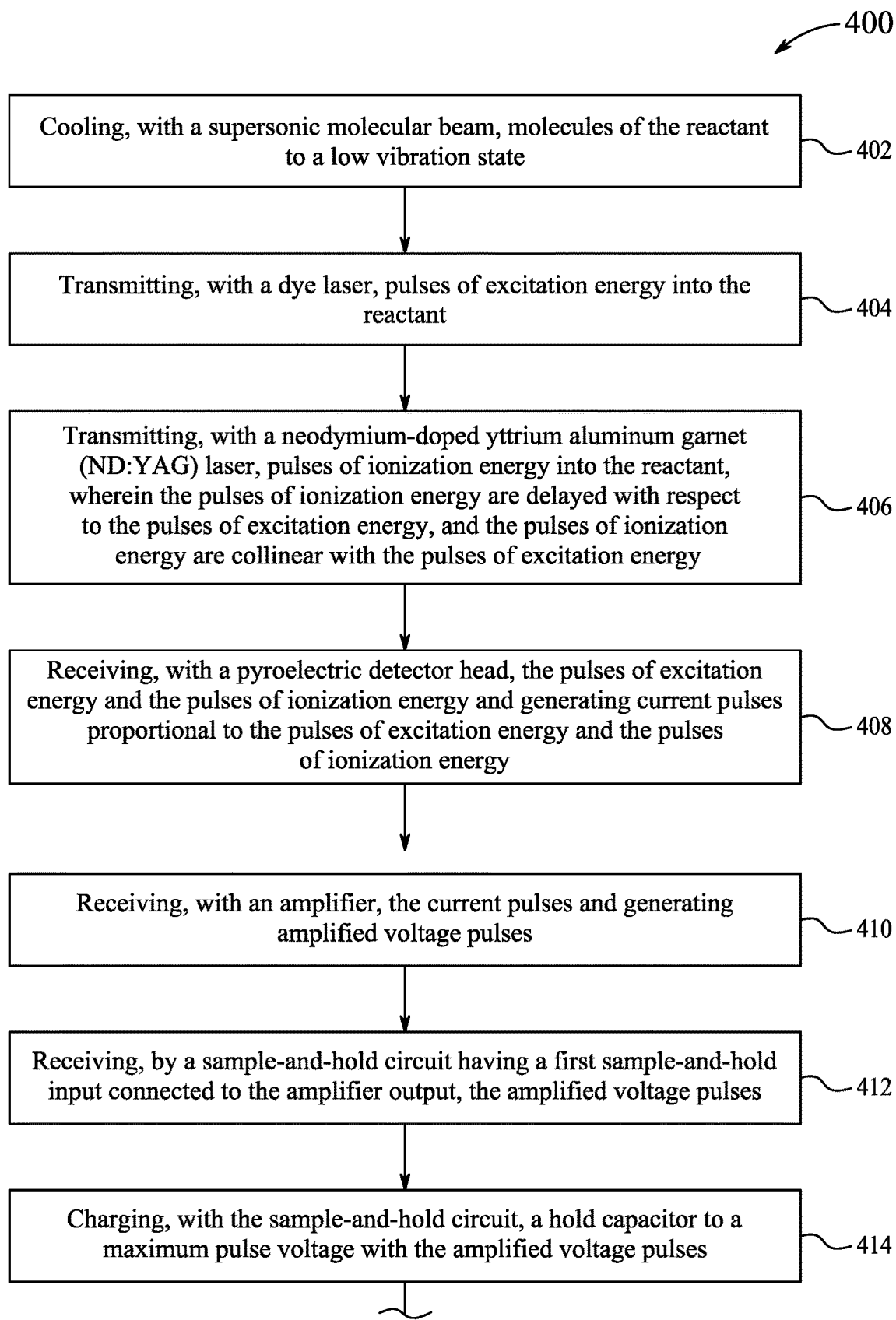
FIG. 4 illustrates a method for measuring excitation and ionization of a reactant, according to aspects of the present disclosure.
Figure 4:
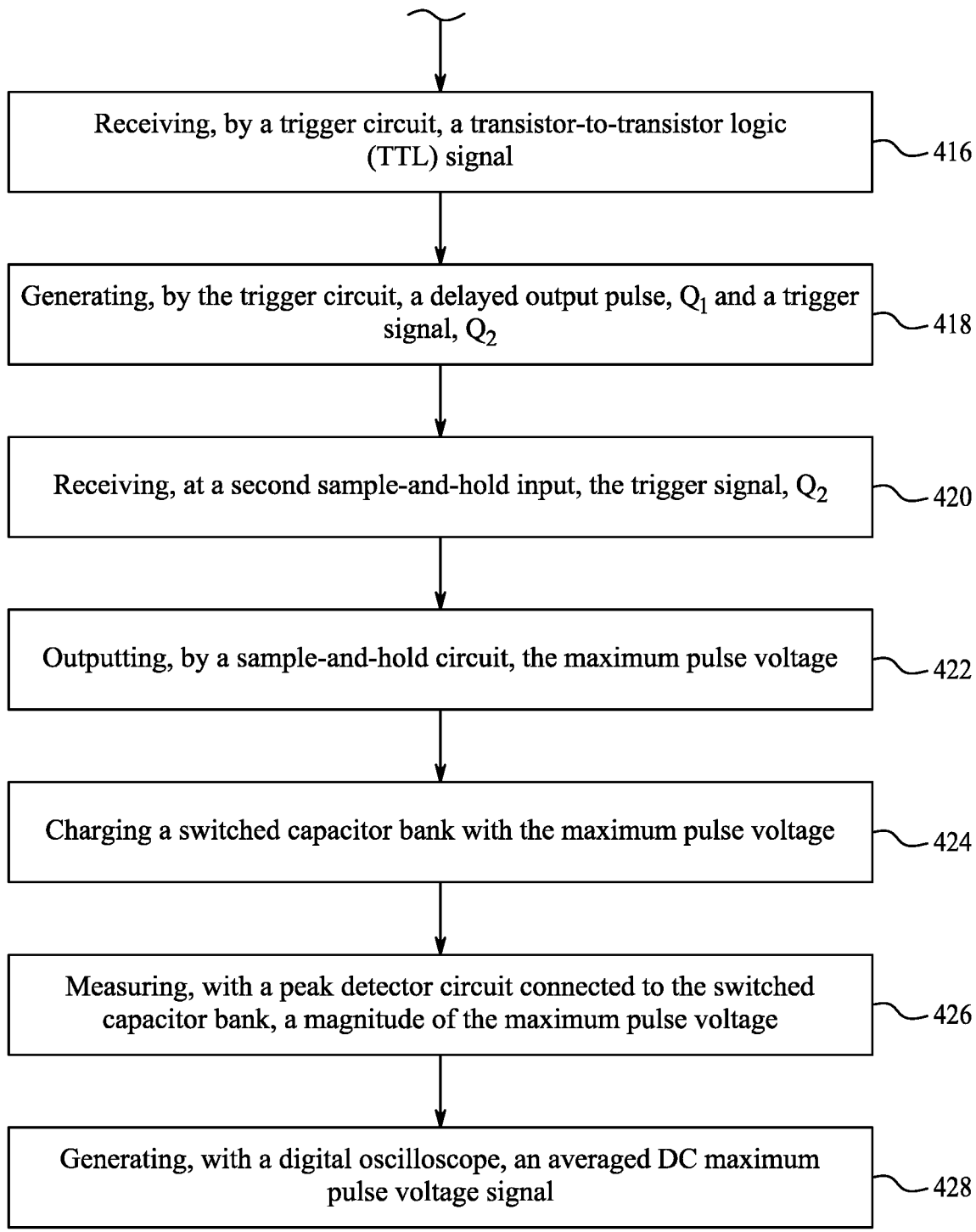

FIG. 4 illustrates a method 400 for measuring excitation and ionization of the reactant, according to aspects of the present disclosure.

Step 402 includes cooling molecules of the reactant to a low vibration state with a supersonic molecular beam. In an example, a vacuum detection chamber 220 is configured to generate the supersonic molecular beam.

Step 404 includes transmitting pulses of excitation energy into the reactant with the dye laser 206.

Step 406 includes transmitting pulses of ionization energy into the reactant with the neodymium-doped yttrium aluminum garnet (ND:YAG) laser 204. In one example, the pulses of ionization energy are delayed with respect to the pulses of excitation energy. In some examples, the pulses of ionization energy are collinear with the pulses of excitation energy.

Step 408 includes receiving the pulses of excitation energy and the pulses of ionization energy with the pyroelectric detector head 102, and generating current pulses proportional to the pulses of excitation energy and the pulses of ionization energy.

Step 410 includes receiving the current pulses and generating amplified voltage pulses with an amplifier 104, 304.

Step 412 includes receiving the amplified voltage pulses by the sample-and-hold circuit 106, 306. The sample-and-hold circuit 106, 306 includes a first sample-and-hold input connected to the amplifier output.

Step 414 includes charging the hold capacitor ($C_H$) to a maximum pulse voltage with the amplified voltage pulses with the sample-and-hold circuit 106.

Step 416 includes receiving a TTL signal by the trigger circuit 108.

Step 418 includes generating a delayed output pulse, $Q_1$ and a trigger signal, $Q_2$ by the trigger circuit 108.

Step 420 includes receiving the trigger signal, $Q_2$ at a second sample-and-hold input (for example at pin 8 of the sample-and-hold circuit 306).

Step 422 includes outputting the maximum pulse voltage by the sample-and-hold circuit 106, 306.

Step 424 includes charging a switched capacitor bank (for example, the switched capacitor bank 317 of the filter circuit 316) with the maximum pulse voltage.

Step 426 includes measuring a magnitude of the maximum pulse voltage with a peak detector circuit 118. The peak detector circuit 118 is connected to the switched capacitor bank.

Step 428 includes generating an averaged DC maximum pulse voltage signal with a digital oscilloscope 234, 334.

In an aspect, the method 400 further includes receiving the delayed output pulse, $Q_1$ and the trigger signal, $Q_2$, with a pulse generator 202. The pulse generator 202 generates a first time delayed electrical pulse and a second time delayed electrical pulse. The first time delayed electrical pulse is connected to a flash lamp of the dye laser 206 and the second time delayed electrical pulse is connected to a Q switch of the ND:YAG laser 204.

In an example, the method 400 further includes triggering the dye laser 206 to transmit the pulses of excitation energy upon receiving the first time delayed electrical pulse. In another example, the method further includes triggering the ND:YAG laser 204 to transmit the pulses of ionization energy upon receiving the second time delayed electrical pulse.

In an example, the method 400 further includes a step of receiving TTL signal from a Q switch of the ND:YAG laser 204 at a base of a transistor 310. In another example, the method further includes step of receiving the TTL signal at an emitter of the transistor 310 and generating the delayed output pulse, $Q_1$, with a first monostable vibrator 313 connected to the emitter.

Further, the method 400 includes a step of sampling the delayed output pulse with a second monostable vibrator 314 connected in series with the first monostable vibrator 313 and generating the trigger signal, $Q_2$.

The method 400 further includes a step of changing a capacitance of the switched capacitor bank by closing at least one switch to add a respective capacitor to the capacitor bank.

An isolation resistor, $R_M$, is connected to the peak detector circuit 118 and the capacitor bank and configured to set a hold settling time of the peak detector circuit 118.

The first embodiment is illustrated with respect to FIGS. 1-4. The first embodiment describes the laser energy meter circuit 100. The laser energy meter circuit 100 includes a pyroelectric detector head 102 configured to receive laser pulses and output current signals proportional to the laser pulses, an amplifier 104 having a first amplifier input and an amplifier output, wherein the first amplifier input is connected to the pyroelectric detector head 102 and configured to receive the current signals and the amplifier output is configured to generate amplified voltage signals, a sample-and-hold circuit 106 having a first sample-and-hold input connected to the amplifier output to receive the amplified voltage pulses, wherein the sample-and-hold circuit is configured to charge a hold capacitor to a maximum pulse voltage with the amplified voltage pulses, a trigger circuit connected to a second sample-and-hold input, wherein the trigger circuit 108 is configured to receive a transistor-to-transistor logic (TTL) signal and generate a delayed output pulse, $Q_1$ and a trigger signal, $Q_2$, a sample-and-hold circuit output configured to output the maximum pulse voltage when the trigger signal is received at the second sample-and-hold input; a switched capacitor bank connected to the sample-and-hold circuit output, and a peak detector circuit connected to the switched capacitor bank, wherein the peak detector circuit 118 is configured to measure a magnitude of the maximum pulse voltage and generate an averaged DC maximum pulse voltage signal.

The trigger circuit 108 includes a transistor 110 having a base connected to a laser Q-switch, a diode connected to an emitter of the transistor, a collector resistor ($R_C$) 312 connected to a collector of the transistor 310, a first monostable vibrator 112 connected to the emitter, wherein the first monostable vibrator 112 is configured to receive the transistor-to-transistor logic (TTL) signal from the laser Q-switch, and generate the delayed output pulse, $Q_1$; and a second monostable vibrator 114 connected in series with the first monostable vibrator 112, wherein the second monostable vibrator is configured to sample the delayed output pulse and generate the trigger signal, $Q_2$.

The laser energy meter circuit includes an amplifier feedback path between a second amplifier input and the amplifier output, wherein the amplifier feedback path includes a voltage divider formed by a first resistor in series with the feedback path and first variable resistor connected to a ground.

The laser energy meter circuit 100 further includes the first filter circuit 328 connected between the amplifier output and the first sample-and-hold input, wherein the first filter circuit 328 includes a first capacitor connected in series with the amplifier output and a second resistor connected between the first capacitor and the ground.

In an aspect, the laser energy meter circuit 100 a hold capacitor, $C_H$, connected to the sample-and-hold circuit between a logic reference pin and a capacitor input pin, a second variable resistor connected between the logic reference pin and an offset pin, and wherein the hold capacitor, $C_H$, and the variable resistor circuit are configured to provide an adjustable sampling window to the sample-and-hold circuit.

The laser energy meter circuit 100 further includes a second filter circuit 316. The second filter circuit 316 includes an isolation resistor, $R_M$, connected to the sample-and-hold circuit output, and a switched capacitor bank including a plurality of bank capacitors 317 and a plurality of switches, wherein each bank capacitor is in series with a respective switch and in parallel with each other bank capacitor, wherein closing a respective switch adds a capacitance of a respective capacitor to a summed capacitance of the capacitor bank. The isolation resistor, $R_M$, and the summed capacitance are configured to set a hold settling time of the peak detector circuit.

In an aspect, the peak detector circuit 118 includes a unity gain buffer, and a digital oscilloscope. The unity gain buffer includes a first unity gain buffer input connected to the second filter circuit, wherein the first unity gain buffer input is configured to receive the maximum pulse voltage, a second unity gain buffer input connected to a unity gain buffer output, wherein the unity gain buffer output is configured to receive the maximum pulse voltage and generate a maximum voltage signal every second. The digital oscilloscope includes a plurality of input channels, where one of the input channels is connected to the unity gain buffer output to receive the DC maximum voltage signal, wherein the digital oscilloscope is configured to average the DC maximum voltage signals and generate the averaged DC maximum voltage signal at an output channel.

The second embodiment is illustrated with respect to FIGS. 1-4. The second embodiment describes a system 200 for measuring excitation and ionization of a reactant. The system 200 includes a supersonic molecular beam source 220 (vacuum detection chamber) configured to cool molecules of the reactant to a low vibration state; a dye laser 206 configured to transmit pulses of excitation energy into the reactant; a neodymium-doped yttrium aluminum garnet (ND:YAG) laser 204 configured to transmit pulses of ionization energy into the reactant, wherein the pulses of ionization energy are delayed with respect to the pulses of excitation energy, and the pulses of ionization energy are collinear with the pulses of excitation energy; a pyroelectric detector head 230 configured to receive the pulses of excitation energy and the pulses of ionization energy and generate current pulses proportional to the pulses of excitation energy and the pulses of ionization energy; and a laser energy meter circuit. The laser energy meter circuit 232 includes an amplifier having a first amplifier input and an amplifier output, wherein the first amplifier input is connected to the pyroelectric detector head and is configured to receive the current pulses, and wherein the amplifier output is configured to generate amplified voltage pulses; a sampleand-hold circuit having a first sample-and-hold input connected to the amplifier output to receive the amplified voltage pulses, wherein the sample-and-hold circuit is configured to charge a hold capacitor to a maximum pulse voltage with the amplified voltage pulses; a trigger circuit connected to a second sample-and-hold input, wherein the trigger circuit is configured to receive a transistor-to-transistor logic (TTL) signal and generate a delayed output pulse, $Q_1$ and a trigger signal, $Q_2$; a sample-and-hold circuit output configured to output the maximum pulse voltage when the trigger signal is received at the second sample-and-hold input; a switched capacitor bank connected to the sample-and-hold circuit output; and a peak detector circuit connected to the switched capacitor bank, wherein the peak detector circuit is configured to measure a magnitude of the maximum pulse voltage and generate an averaged DC maximum pulse voltage signal.

In an aspect, the peak detector circuit includes a unity gain buffer configured to hold the maximum pulse voltage; and a digital oscilloscope configured to receive the maximum pulse voltage each time it is triggered by the delayed output pulse, $Q_1$, wherein the digital oscilloscope is configured to average the maximum pulse voltages and generate the averaged DC maximum voltage signal at an output channel.

In an aspect, the system 200 includes a pulse generator 202 configured to receive the delayed output pulse, $Q_1$ and the trigger signal, $Q_2$, and generate a first time delayed electrical pulse and a second time delayed electrical pulse, wherein the first time delayed electrical pulse is connected to a flash lamp of the ND:YAG laser 204 and the second time delayed electrical pulse is connected to a Q switch of the ND:YAG laser 204.

In an aspect, the system 200 further includes a transistor having a base connected to a Q switch of the ND:YAG laser, a diode 311 connected to an emitter of the transistor, a collector resistor ($R_C$) 312 connected to a collector of the transistor, a first monostable vibrator input connected to the emitter, wherein the first monostable vibrator is configured to receive the transistor-to-transistor logic (TTL) signal from the Q-switch, and generate the delayed output pulse, $Q_1$, and a second monostable vibrator connected in series with the first monostable vibrator, wherein the second monostable vibrator is configured to sample the delayed output pulse and generate the trigger signal, $Q_2$.

In an aspect, the system 200 further includes an amplifier feedback path between a second amplifier input and the amplifier output, wherein the amplifier feedback path includes a voltage divider formed by a first resistor in series with the feedback path and first variable resistor connected to a ground.

In an aspect, the system 200 further includes a first filter circuit connected between the amplifier output and the first sample-and-hold input, wherein the first filter circuit includes a first capacitor connected in series with the amplifier output and a second resistor connected between the first capacitor and the ground.

In an aspect, the system 200 further includes a hold capacitor, $C_H$, is connected to the sample-and-hold circuit between a logic reference pin and a capacitor input pin, a second variable resistor is connected between the logic reference pin and an offset pin, and the hold capacitor, $C_H$, and the second variable resistor are configured to provide an adjustable sampling window to the sample-and-hold circuit.

In an aspect, the system 200 further includes a switched capacitor bank which includes a plurality of bank capacitors and a plurality of switches, wherein each bank capacitor is in series with a respective switch and in parallel with each other bank capacitor, a capacitance of a respective capacitor is added to a summed capacitance of the capacitor bank by closing a respective switch, and the isolation resistor, $R_M$, and the summed capacitance are configured to set a hold settling time of the peak detector circuit.

The third embodiment is illustrated with respect to FIGS. 1-4. The third embodiment describes a method for measuring excitation and ionization of a reactant. The method includes cooling, with a supersonic molecular beam, molecules of the reactant to a low vibration state; transmitting, with a dye laser 206, pulses of excitation energy into the reactant; transmitting, with a neodymium-doped yttrium aluminum garnet (ND:YAG) laser 206, pulses of ionization energy into the reactant, wherein the pulses of ionization energy are delayed with respect to the pulses of excitation energy, and the pulses of ionization energy are collinear with the pulses of excitation energy; receiving, with a pyroelectric detector head 102, the pulses of excitation energy and the pulses of ionization energy and generating current pulses proportional to the pulses of excitation energy and the pulses of ionization energy; receiving, with an amplifier 104, the current pulses and generating amplified voltage pulses; receiving, by a sample-and-hold circuit 106 having a first sample-and-hold input connected to the amplifier output, the amplified voltage pulses; charging, with the sample-and-hold circuit, a hold capacitor to a maximum pulse voltage with the amplified voltage pulses; receiving, by a trigger circuit, a transistor-to-transistor logic (TTL) signal; generating. by the trigger circuit 108, a delayed output pulse, $Q_1$ and a trigger signal, $Q_2$; receiving, at a second sample-and-hold input, the trigger signal, $Q_2$; outputting, by a sample-and-hold circuit, the maximum pulse voltage; charging a switched capacitor bank with the maximum pulse voltage; measuring, with a peak detector circuit connected to the switched capacitor bank, a magnitude of the maximum pulse voltage; and generating, with a digital oscilloscope, an averaged DC maximum pulse voltage signal.

The method includes receiving, with a pulse generator 202, the delayed output pulse, $Q_1$ and the trigger signal, $Q_2$; and generating, a first time delayed electrical pulse and a second time delayed electrical pulse, wherein the first time delayed electrical pulse is connected to a flash lamp of the dye laser 206 and the second time delayed electrical pulse is connected to a Q switch of the ND:YAG laser 204.

The method further includes triggering the dye laser 206 to transmit the pulses of excitation energy upon receiving the first time delayed electrical pulse; and triggering the ND:YAG laser to transmit the pulses of ionization energy upon receiving the second time delayed electrical pulse.

The method further includes receiving, at a base of a transistor, a transistor-to-transistor logic (TTL) signal from a Q switch of the ND:YAG laser 204; receiving, at an emitter of the transistor, the transistor-to-transistor logic (TTL) signal; generating, with a first monostable vibrator connected to the emitter, the delayed output pulse, $Q_1$; sampling, with a second monostable vibrator connected in series with the first monostable vibrator, the delayed output pulse; and generating the trigger signal, $Q_2$.

The method further includes changing a capacitance of the switched capacitor bank by closing at least one switch to add a respective capacitor to the capacitor bank, wherein an isolation resistor, $R_M$, connected to the peak detector circuit and the capacitor bank, set a hold settling time of the peak detector circuit.

Figure 5:
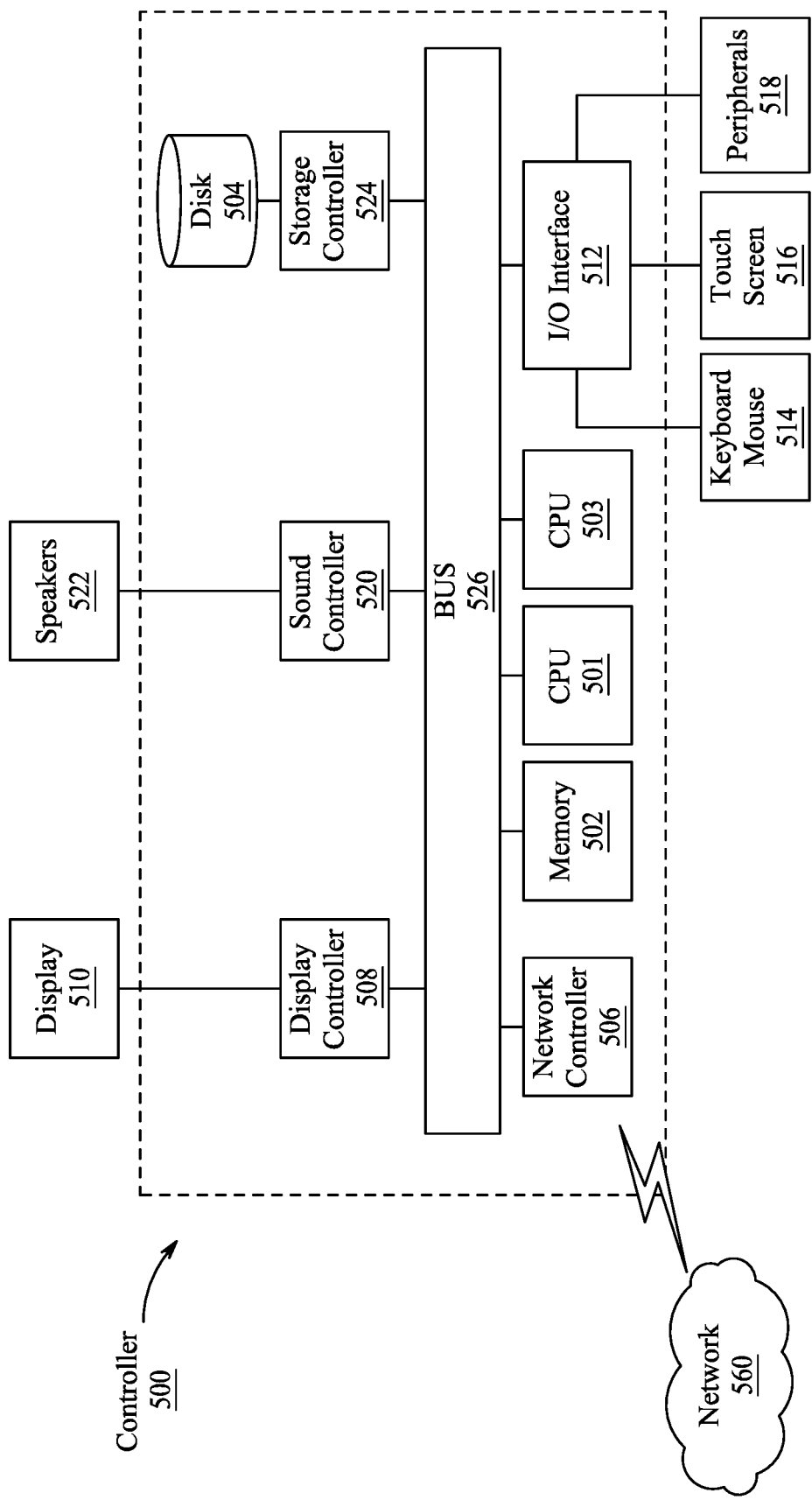
FIG. 5 is an illustration of a non-limiting example of details of computing hardware used in the computing system, according to certain embodiments.

Next, further details of the hardware description of the computing environment of FIGS. 1-2 according to exemplary embodiments is described with reference to FIG. 5. In FIG. 5, a processing circuitry 500 is described as representative of the system 200 of FIG. 1 in which the laser energy meter circuit is a computing device which includes a CPU 501 which performs the processes described above/below. The process data and instructions may be stored in memory 502. These processes and instructions may also be stored on a storage medium disk 504 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 501 or CPU 503 may be a Xenon or Core processor from Intel of America or an Opteron processor from AMD of America, or may be other processor types that would be recognized by one of ordinary skill in the art. Alternatively, the CPU 501, 503 may be implemented on an FPGA, ASIC, PLD or using discrete logic circuits, as one of ordinary skilled in the art would recognize. Further, CPU 501, 503 may be implemented as multiple processors cooperatively working in parallel to perform the instructions of the inventive processes described above.

The computing device in FIG. 5 also includes a network controller 506, such as an Intel Ethernet PRO network interface card from Intel Corporation of America, for interfacing with network 560. As can be appreciated, the network 560 can be a public network, such as the Internet, or a private network such as an LAN or WAN network, or any combination thereof and can also include PSTN or ISDN sub-networks. The network 560 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 508, such as a NVIDIA GeForce GTX or Quadro graphics adaptor from NVIDIA Corporation of America for interfacing with display 510, such as a Hewlett Packard HPL2445w LCD monitor. A general purpose I/O interface 512 interfaces with a keyboard and/or mouse 514 as well as a touch screen panel 516 on or separate from display 510. General purpose I/O interface also connects to a variety of peripherals 518 including printers and scanners, such as an OfficeJet or DeskJet from Hewlett Packard.

A sound controller 520 is also provided in the computing device such as Sound Blaster X-Fi Titanium from Creative, to interface with speakers/microphone 522 thereby providing sounds and/or music.

The general purpose storage controller 524 connects the storage medium disk 804 with communication bus 526, which may be an ISA, EISA, VESA, PCI, or similar, for interconnecting all of the components of the computing device. A description of the general features and functionality of the display 510, keyboard and/or mouse 514, as well as the display controller 508, storage controller 524, network controller 506, sound controller 520, and general purpose I/O interface 512 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 6.

Figure 6:
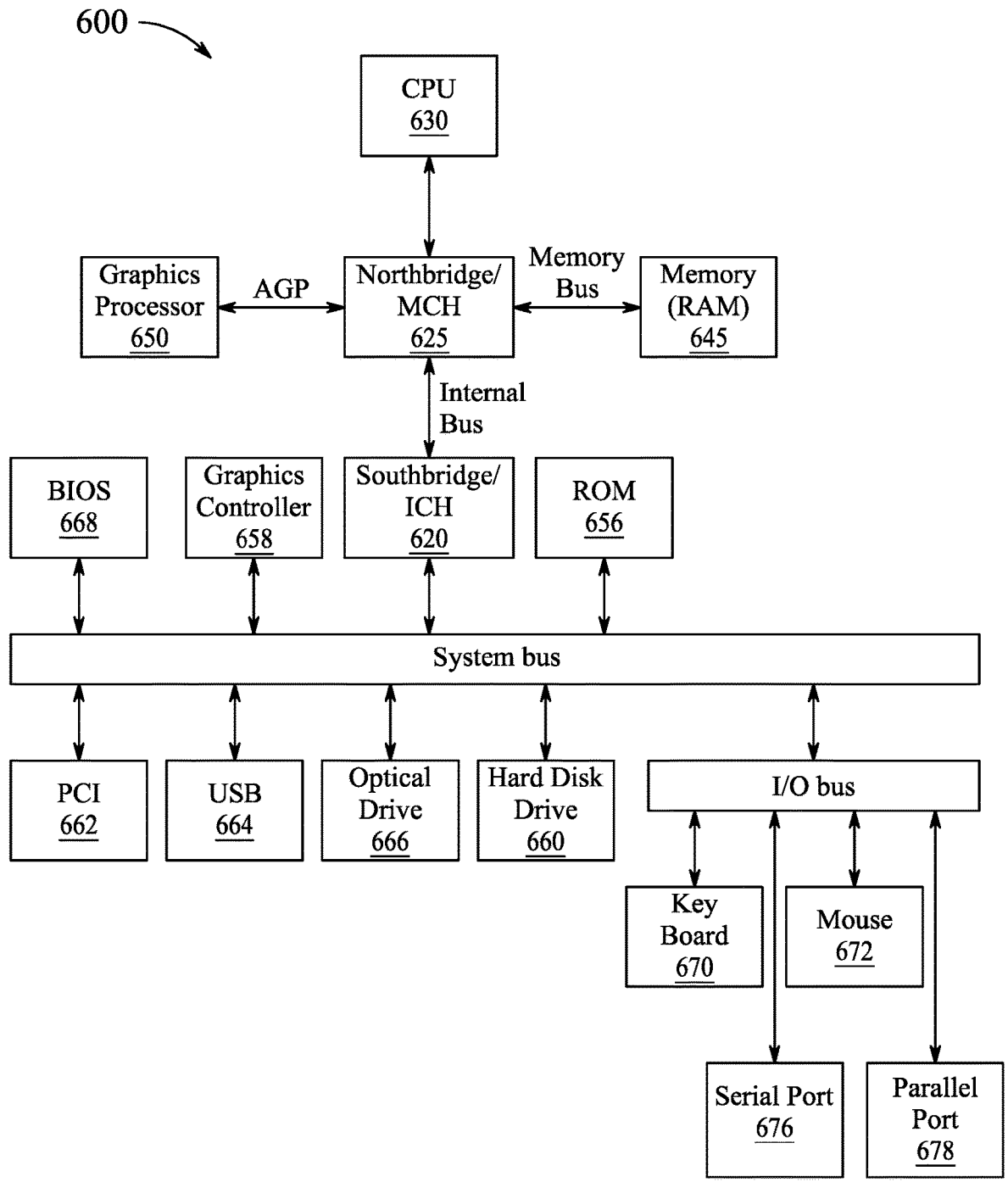
FIG. 6 is an exemplary schematic diagram of a data processing system used within the computing system, according to certain embodiments.

FIG. 6 shows a schematic diagram of a data processing system, according to certain embodiments, for performing the functions of the exemplary embodiments. The data processing system is an example of a computer in which code or instructions implementing the processes of the illustrative embodiments may be located.

In FIG. 6, data processing system 600 employs a hub architecture including a north bridge and memory controller hub (NB/MCH) 625 and a south bridge and input/output (I/O) controller hub (SB/ICH) 620. The central processing unit (CPU) 630 is connected to NB/MCH 625. The NB/MCH 625 also connects to the memory 645 via a memory bus, and connects to the graphics processor 650 via an accelerated graphics port (AGP). The NB/MCH 625 also connects to the SB/ICH 620 via an internal bus (e.g., a unified media interface or a direct media interface). The CPU Processing unit 630 may contain one or more processors and even may be implemented using one or more heterogeneous processor systems.

Figure 7:
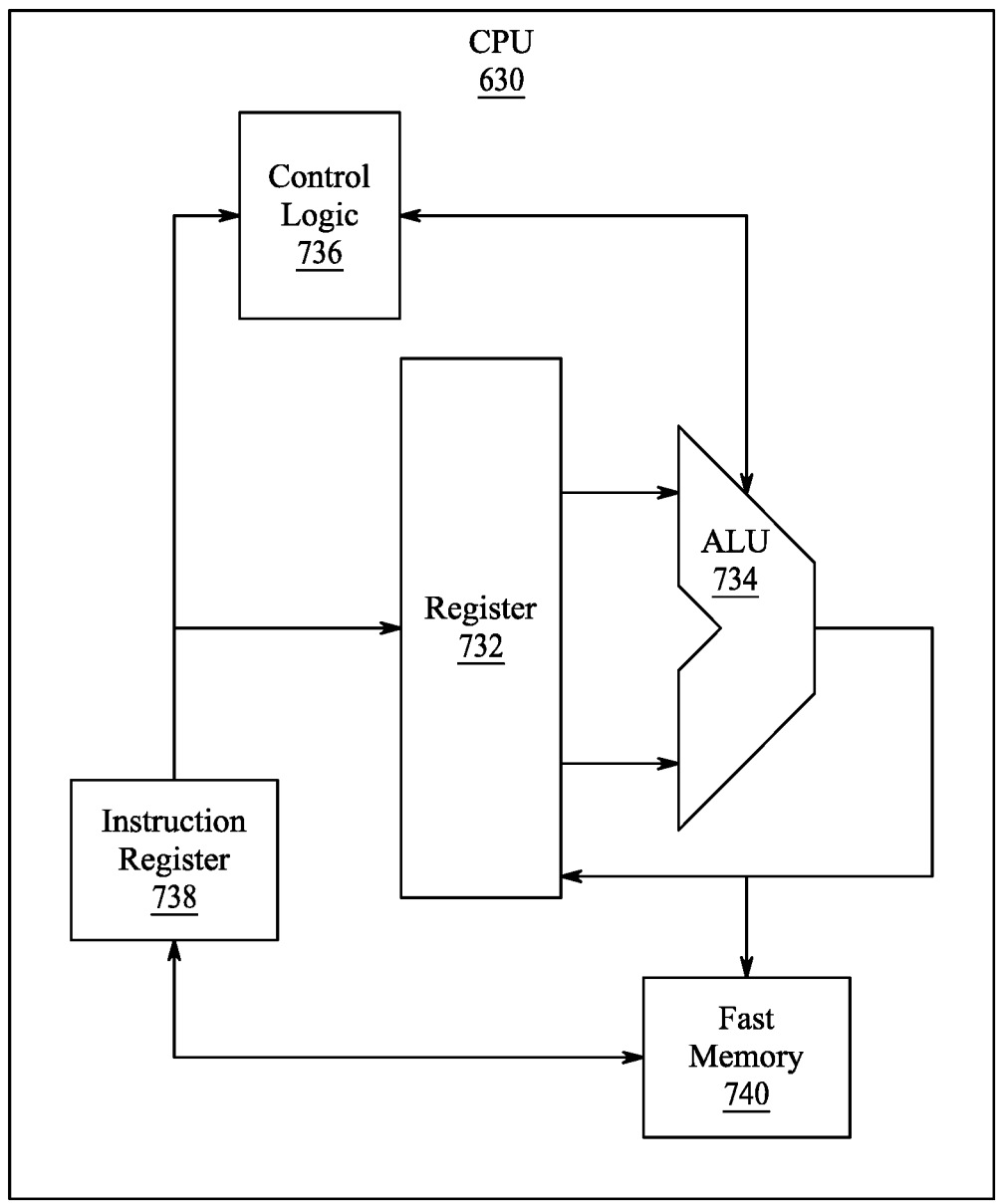
FIG. 7 is an exemplary schematic diagram of a processor used with the computing system, according to certain embodiments.

For example, FIG. 7 shows one implementation of CPU 630. In one implementation, the instruction register 738 retrieves instructions from the fast memory 740. At least part of these instructions is fetched from the instruction register 738 by the control logic 736 and interpreted according to the instruction set architecture of the CPU 630. Part of the instructions can also be directed to the register 732. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 734 that loads values from the register 732 and performs logical and mathematical operations on the loaded values according to the instructions. The results from these operations can be feedback into the register and/or stored in the fast memory 740. According to certain implementations, the instruction set architecture of the CPU 730 can use a reduced instruction set architecture, a complex instruction set architecture, a vector processor architecture, a very large instruction word architecture. Furthermore, the CPU 630 can be based on the Von Neuman model or the Harvard model. The CPU 630 can be a digital signal processor, an FPGA, an ASIC, a PLA, a PLD, or a CPLD. Further, the CPU 630 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 6, the data processing system 600 can include that the SB/ICH 620 is coupled through a system bus to an I/O Bus, a read only memory (ROM) 656, universal serial bus (USB) port 664, a flash binary input/output system (BIOS) 668, and a graphics controller 658. PCI/PCIe devices can also be coupled to SB/ICH 688 through a PCI bus 662.

The PCI devices may include, for example, Ethernet adapters, add-in cards, and PC cards for notebook computers. The Hard disk drive 660 and CD-ROM 666 can use, for example, an integrated drive electronics (IDE) or serial advanced technology attachment (SATA) interface. In one implementation the I/O bus can include a super I/O (SIO) device.

Further, the hard disk drive (HDD) 660 and optical drive 666 can also be coupled to the SB/ICH 620 through a system bus. In one implementation, a keyboard 670, a mouse 672, a parallel port 678, and a serial port 676 can be connected to the system bus through the I/O bus. Other peripherals and devices that can be connected to the SB/ICH 620 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 8:
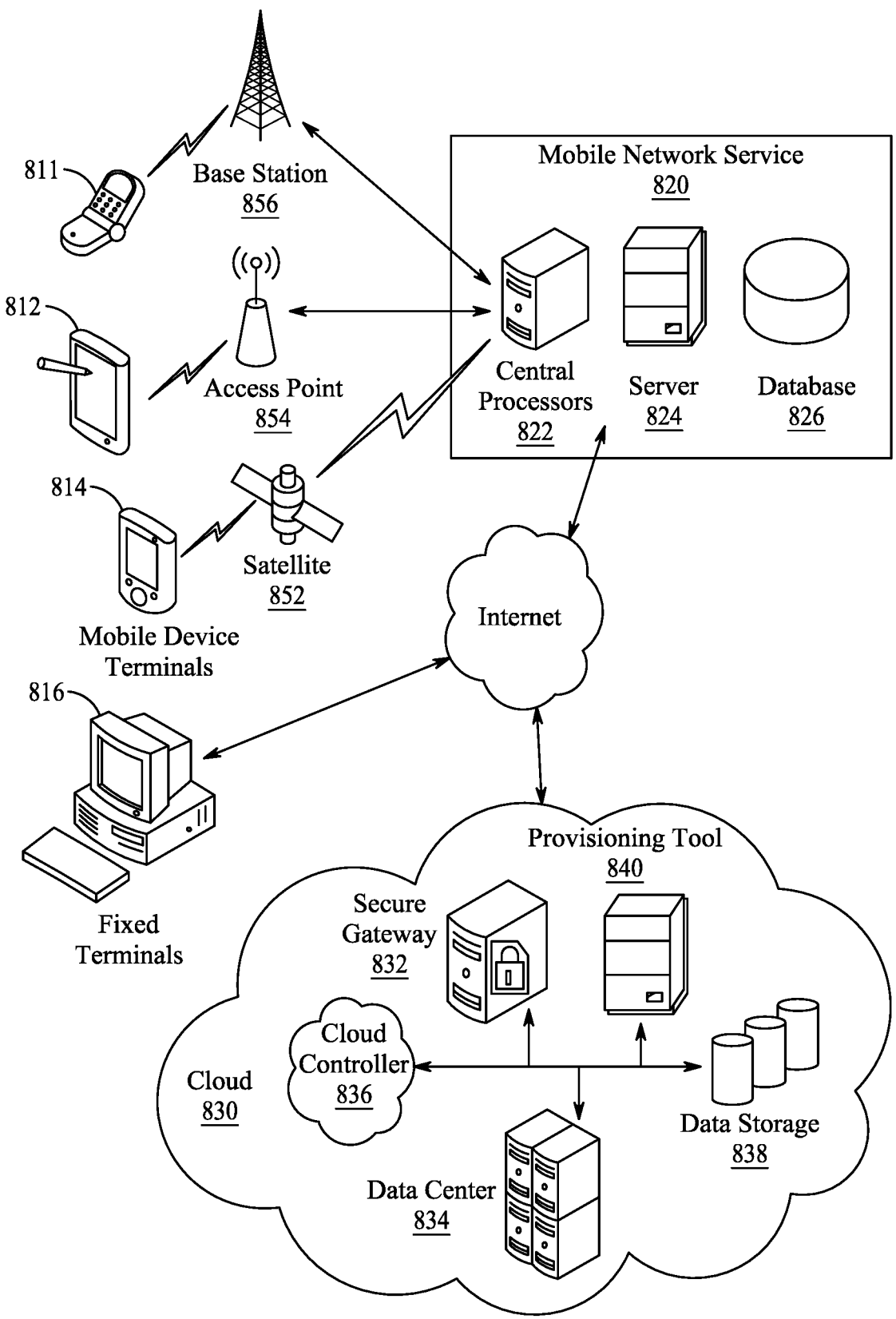
FIG. 8 is an illustration of a non-limiting example of distributed components that may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 8, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely, either in real-time or as a batch process. Additionally, some aspects of the present disclosures may be performed on modules or hardware not identical to those described. Accordingly, other aspects of the present disclosures are within the scope that may be claimed. More specifically, FIG. 8 illustrates client devices including smart phone 811, tablet 812, mobile device terminal 814, and fixed terminals 816. These client devices may be commutatively coupled with a mobile network service 820 via base station 856, access point 854, satellite 852 or via an internet connection. Mobile network service 820 may comprise central processors 822, server 824 and database 826. Fixed terminals 816 and mobile network service 820 may be commutatively coupled via an internet connection to functions in cloud 830 that may comprise security gateway 832, data center 834, cloud controller 836, data storage 838 and provisioning tool 840.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A laser energy meter circuit, comprising:
a pyroelectric detector head configured to receive laser pulses and to output current signals proportional to the laser pulses;
an amplifier having a first amplifier input and an amplifier output, wherein the first amplifier input is connected to the pyroelectric detector head and configured to receive the current signals and the amplifier output is configured to generate amplified voltage signals;
a sample-and-hold circuit having a first sample-and-hold input connected to the amplifier output to receive the amplified voltage pulses, wherein the sample-and-hold circuit is configured to charge a hold capacitor to a maximum pulse voltage with the amplified voltage pulses;
a trigger circuit connected to a second sample-and-hold input, wherein the trigger circuit is configured to receive a transistor-to-transistor logic (TTL) signal and generate a delayed output pulse, $Q_1$ and a trigger signal, $Q_2$;
a sample-and-hold circuit output configured to output the maximum pulse voltage when the trigger signal is received at the second sample-and-hold input;
a switched capacitor bank connected to the sample-and-hold circuit output;
a peak detector circuit connected to the switched capacitor bank, wherein the peak detector circuit is configured to measure a magnitude of the maximum pulse voltage and generate an averaged DC maximum pulse voltage signal.

2. The laser energy meter circuit of claim 1, wherein the trigger circuit comprises:
a transistor having a base connected to a laser Q-switch;
a diode connected to an emitter of the transistor;
a collector resistor connected to a collector of the transistor;
a first monostable vibrator connected to the emitter, wherein the first monostable vibrator is configured to receive the transistor-to-transistor logic (TTL) signal from the laser Q-switch, and generate the delayed output pulse, $Q_1$; and
a second monostable vibrator connected in series with the first monostable vibrator, wherein the second monostable vibrator is configured to sample the delayed output pulse and generate the trigger signal, $Q_2$.

3. The laser energy meter circuit of claim 2, further comprising:
an amplifier feedback path between a second amplifier input and the amplifier output, wherein the amplifier feedback path includes a voltage divider formed by a first resistor in series with the feedback path and a first variable resistor connected to a ground.

4. The laser energy meter circuit of claim 3, further comprising:
a first filter circuit connected between the amplifier output and the first sample-and-hold input, wherein the first filter circuit includes a first capacitor connected in series with the amplifier output and a second resistor connected between the first capacitor and the ground.

5. The laser energy meter circuit of claim 4, further comprising:

a hold capacitor, $C_H$, connected to the sample-and-hold circuit between a logic reference pin and a capacitor input pin;

a second variable resistor connected between the logic reference pin and an offset pin; and wherein the hold capacitor, $C_H$, and the second variable resistor are configured to provide an adjustable sampling window to the sample-and-hold circuit.

6. The laser energy meter circuit of claim 5, further comprising:

a second filter circuit, including:
an isolation resistor, $R_M$, connected to the sample-and-hold circuit output; and
a switched capacitor bank including a plurality of bank capacitors and a plurality of switches, wherein each bank capacitor is in series with a respective switch and in parallel with each other bank capacitor, wherein the switched capacitor bank is configured such that closing a respective switch adds a capacitance of a respective capacitor to a summed capacitance of the capacitor bank; and
wherein the isolation resistor, $R_M$, and the summed capacitance are configured to set a hold settling time of the peak detector circuit.

7. The laser energy meter circuit of claim 6, wherein the peak detector circuit includes:

a unity gain buffer having
a first unity gain buffer input connected to the second filter circuit, wherein the first unity gain buffer input is configured to receive the maximum pulse voltage,
a second unity gain buffer input connected to a unity gain buffer output,
wherein the unity gain buffer output is configured to receive the maximum pulse voltage and generate a maximum voltage signal every second; and
a digital oscilloscope having a plurality of input channels, where one of the input channels is connected to the unity gain buffer output to receive the DC maximum voltage signal, wherein the digital oscilloscope is configured to average the DC maximum voltage signals and generate the averaged DC maximum voltage signal at an output channel.

8. A system for measuring excitation and ionization of a reactant, comprising:

a supersonic molecular beam source configured to cool molecules of the reactant to a low vibration state;

a dye laser configured to transmit pulses of excitation energy into the reactant;

a neodymium-doped yttrium aluminum garnet (ND:YAG) laser configured to transmit pulses of ionization energy into the reactant, wherein the pulses of ionization energy are delayed with respect to the pulses of excitation energy, and the pulses of ionization energy are collinear with the pulses of excitation energy;

a pyroelectric detector head configured to receive the pulses of excitation energy and the pulses of ionization energy and generate current pulses proportional to the pulses of excitation energy and the pulses of ionization energy;

a laser energy meter circuit including:
an amplifier having a first amplifier input and an amplifier output, wherein the first amplifier input is connected to the pyroelectric detector head and is configured to receive the current pulses, and wherein the amplifier output is configured to generate amplified voltage pulses;

a sample-and-hold circuit having a first sample-and-hold input connected to the amplifier output to receive the amplified voltage pulses, wherein the sample-and-hold circuit is configured to charge a hold capacitor to a maximum pulse voltage with the amplified voltage pulses;

a trigger circuit connected to a second sample-and-hold input, wherein the trigger circuit is configured to receive a transistor-to-transistor logic (TTL) signal and generate a delayed output pulse, Q1 and a trigger signal, Q2;

a sample-and-hold circuit output configured to output the maximum pulse voltage when the trigger signal is received at the second sample-and-hold input;

a switched capacitor bank connected to the sample-and-hold circuit output; and a peak detector circuit connected to the switched capacitor bank, wherein the peak detector circuit is configured to measure a magnitude of the maximum pulse voltage and generate an averaged DC maximum pulse voltage signal.

9. The system of claim 8, wherein the peak detector circuit comprises:

a unity gain buffer configured to hold the maximum pulse voltage; and a digital oscilloscope configured to receive the maximum pulse voltage each time it is triggered by the delayed output pulse, Q1, wherein the digital oscilloscope is configured to average the maximum pulse voltages and generate the averaged DC maximum voltage signal at an output channel.

10. The system of claim 9, further comprising:

a pulse generator configured to receive the delayed output pulse, Q1 and the trigger signal, Q2, and generate a first time delayed electrical pulse and a second time delayed electrical pulse, wherein the first time delayed electrical pulse is connected to a flash lamp of the ND:YAG laser and the second time delayed electrical pulse is connected to a Q switch of the ND:YAG laser.

11. The system of claim 9, wherein the trigger circuit comprises:

a transistor having a base connected to a Q switch of the ND:YAG laser;

a diode connected to an emitter of the transistor;

a collector resistor connected to a collector of the transistor;

a first monostable vibrator input connected to the emitter, wherein the first monostable vibrator is configured to receive the transistor-to-transistor logic (TTL) signal from the Q-switch, and generate the delayed output pulse, Q1; and a second monostable vibrator connected in series with the first monostable vibrator, wherein the second monostable vibrator is configured to sample the delayed output pulse and generate the trigger signal, Q2.

12. The system of claim 11, further comprising:

an amplifier feedback path between a second amplifier input and the amplifier output, wherein the amplifier feedback path includes a voltage divider formed by a first resistor in series with the feedback path and a first variable resistor connected to a ground.

13. The system of claim 12, further comprising:

a first filter circuit connected between the amplifier output and the first sample-and-hold input, wherein the first filter circuit includes a first capacitor connected in series with the amplifier output and a second resistor connected between the first capacitor and the ground.

14. The system of claim 13, wherein:
the hold capacitor, $C_H$, is connected to the sample-and-hold circuit between a logic reference pin and a capacitor input pin;
a second variable resistor connected between the logic reference pin and an offset pin; and
the hold capacitor, $C_H$, and the second variable resistor are configured to provide an adjustable sampling window to the sample-and-hold circuit.

15. The system of claim 14, wherein:
the switched capacitor bank includes a plurality of bank capacitors and a plurality of switches,
each bank capacitor is in series with a respective switch and in parallel with each other bank capacitor, a capacitance of a respective capacitor is added to a summed capacitance of the capacitor bank by closing a respective switch; and
the isolation resistor, $R_M$, and the summed capacitance are configured to set a hold settling time of the peak detector circuit.

16. A method for measuring excitation and ionization of a reactant, comprising:
cooling, with a supersonic molecular beam, molecules of the reactant to a low vibration state;
transmitting, with a dye laser, pulses of excitation energy into the reactant;
transmitting, with a neodymium-doped yttrium aluminum garnet (ND:YAG) laser, pulses of ionization energy into the reactant, wherein the pulses of ionization energy are delayed with respect to the pulses of excitation energy, and the pulses of ionization energy are collinear with the pulses of excitation energy;
receiving, with a pyroelectric detector head, the pulses of excitation energy and the pulses of ionization energy and generating current pulses proportional to the pulses of excitation energy and the pulses of ionization energy;
receiving, with an amplifier, the current pulses and generating amplified voltage pulses;
receiving, by a sample-and-hold circuit having a first sample-and-hold input connected to the amplifier output, the amplified voltage pulses;
charging, with the sample-and-hold circuit, a hold capacitor to a maximum pulse voltage with the amplified voltage pulses;
receiving, by a trigger circuit, a transistor-to-transistor logic (TTL) signal;
generating, by the trigger circuit, a delayed output pulse, $Q_1$ and a trigger signal, $Q_2$;
receiving, at a second sample-and-hold input, the trigger signal, $Q_2$;
outputting, by a sample-and-hold circuit, the maximum pulse voltage;
charging a switched capacitor bank with the maximum pulse voltage;
measuring, with a peak detector circuit connected to the switched capacitor bank, a magnitude of the maximum pulse voltage; and
generating, with a digital oscilloscope, an averaged DC maximum pulse voltage signal.

17. The method of claim 16, further comprising:
receiving, with a pulse generator, the delayed output pulse, $Q_1$ and the trigger signal, $Q_2$; and
generating, a first time delayed electrical pulse and a second time delayed electrical pulse, wherein the first time delayed electrical pulse is connected to a flash lamp of the dye laser and the second time delayed electrical pulse is connected to a Q switch of the ND:YAG laser.

18. The method of claim 17, further comprising:
triggering the dye laser to transmit the pulses of excitation energy upon receiving the first time delayed electrical pulse; and
triggering the ND:YAG laser to transmit the pulses of ionization energy upon receiving the second time delayed electrical pulse.

19. The method of claim 16, further comprising:
receiving, at a base of a transistor, a transistor-to-transistor logic (TTL) signal from a Q switch of the ND:YAG laser;
receiving, at an emitter of the transistor, the transistor-to-transistor logic (TTL) signal;
generating, with a first monostable vibrator connected to the emitter, the delayed output pulse, $Q_1$;
sampling, with a second monostable vibrator connected in series with the first monostable vibrator, the delayed output pulse; and
generating the trigger signal, $Q_2$.

20. The method of claim 16, further comprising:
changing a capacitance of the switched capacitor bank by closing at least one switch to add a respective capacitor to the capacitor bank, wherein an isolation resistor, $R_M$, connected to the peak detector circuit and the capacitor bank, set a hold settling time of the peak detector circuit.

* * * * *